United States Patent
Ledet

(10) Patent No.: US 9,998,552 B1
(45) Date of Patent: Jun. 12, 2018

(54) DYNAMIC CREATION, DATA POPULATION, AND COMMUNICATION ESTABLISHMENT ACROSS VARIOUS MEDIUMS

(75) Inventor: David Gerard Ledet, Allen, TX (US)

(73) Assignee: Open Invention Network LLC, Durham, NC (US)

( * ) Notice: Subject to any disclaimer, the term of this patent is extended or adjusted under 35 U.S.C. 154(b) by 694 days.

(21) Appl. No.: 12/770,981

(22) Filed: Apr. 30, 2010

(51) Int. Cl.
  *G06F 15/16* (2006.01)
  *H04L 29/08* (2006.01)

(52) U.S. Cl.
  CPC ............ *H04L 67/22* (2013.01); *H04L 67/306* (2013.01)

(58) Field of Classification Search
  None
  See application file for complete search history.

(56) References Cited

U.S. PATENT DOCUMENTS

| | | | |
|---|---|---|---|
| 6,839,680 B1 * | 1/2005 | Liu et al. | 705/7.33 |
| 7,100,195 B1 * | 8/2006 | Underwood | G06F 9/4443 707/999.009 |
| 2008/0162206 A1 * | 7/2008 | Mak et al. | 705/7 |
| 2009/0182589 A1 * | 7/2009 | Kendall et al. | 705/5 |
| 2010/0077017 A1 * | 3/2010 | Martinez et al. | 709/201 |
| 2010/0094878 A1 * | 4/2010 | Soroca et al. | 707/748 |
| 2010/0250672 A1 * | 9/2010 | Vance et al. | 709/204 |
| 2010/0281052 A1 * | 11/2010 | Geelen | 707/770 |
| 2011/0065376 A1 * | 3/2011 | Forutanpour et al. | 455/3.01 |
| 2011/0072071 A1 * | 3/2011 | MacWan | 709/203 |
| 2011/0125765 A1 * | 5/2011 | Tuli | 707/751 |
| 2011/0137989 A1 * | 6/2011 | Kiciman et al. | 709/204 |
| 2011/0211813 A1 * | 9/2011 | Marks | 386/297 |

* cited by examiner

*Primary Examiner* — Hua Fan
(74) *Attorney, Agent, or Firm* — Haynes and Boone, LLP

(57) ABSTRACT

On various networked mediums such as web pages, blogs and social networking pages, a user presence can be enhanced by automatically creating a medium. An application on a personal computing device of the user can execute to query local and remote user data, such as webpage ads a user has clicked on, internet surfing history, emails, calendar events, etc. The application processes query responses to determine the current interests of a user to suggest a topic of the medium to the user. The application then creates a medium with a topic and populates the medium with content generated from the query responses such as webpage links, photos, etc. Automatic and configurable updates of the medium can also be performed by processing the local and/or remote user data. Notifications to acquaintances about the medium and updates can also be automated.

18 Claims, 13 Drawing Sheets

US 9,998,552 B1

DYNAMIC CREATION, DATA POPULATION, AND COMMUNICATION ESTABLISHMENT ACROSS VARIOUS MEDIUMS

FIELD OF THE INVENTION

This disclosure relates to systems and methods for creating and updating content on various mediums.

BACKGROUND OF THE INVENTION

In present day communications technology, there are a variety of mediums on which a user can create a presence. These mediums include a webpage, social networking presence, instant messaging accounts and the like. However, in order to enhance a user's presence and popularity, it can be important to ensure that these mediums are dynamic by constantly changing and updating the content of the medium in order to attract attention of other users and acquaintances to the medium.

In previous art, patent application 20090182589 entitled "Communicating Information in a Social Networking Website About Activities from Another Domain" discusses methods to bring related advertisements into the social networking realm by "announcing" that connected users to a given user of the social networking web site have performed a certain action, therefore advertising a product or service to a user that will most probably have an interest. This type of advertisement is termed "Social Ads".

U.S. Pat. No. 6,839,680 entitled "Internet Profiling" discloses software to provide for consistent identification of web users across multiple web sites, servers and domains, monitoring and capturing of data describing the users' web activities, categorization of the web activity data, aggregation of the data in to time dependent models describing interest of users and groups over time.

What is required are improved applications, systems and methods for creating a medium and for providing content to a new or existing medium.

SUMMARY OF THE INVENTION

In one aspect of the disclosure, there is provided a method for generating a medium on a network comprising selecting a medium, processing at least one of local user data and remote user data to determine one or more current interests of a user, selecting a category dependent on the one or more current interests, processing at least one of the local user data and remote user data to automatically generate content for the medium, generating the medium on the network, and populating the medium with the automatically generated content.

In one aspect of the disclosure, there is provided an application for execution on a computing device. The application is configured to present an interface to a user that allows a user to select a medium and indicate one or more parameters of the medium. The application is also configured to automatically create the medium, populate the medium and notify acquaintances of the user of the medium.

In one aspect of the disclosure, there is provided a computer-readable medium comprising computer-executable instructions for execution by at least one processor, that, when executed, cause the at least one processor to present an automatic content behavior interface to a user, receive one or more parameters of at least one automatic content behavior from the user, generate at least one automatic content update for a medium in accordance with the at least one automatic content behavior, and modify a medium with the at least one automatic content update in accordance with the automatic content behavior.

BRIEF DESCRIPTION OF THE DRAWINGS

Reference will now be made, by way of example only, to specific embodiments and to the accompanying drawings in which.

DETAILED DESCRIPTION OF THE INVENTION

Figure 1:
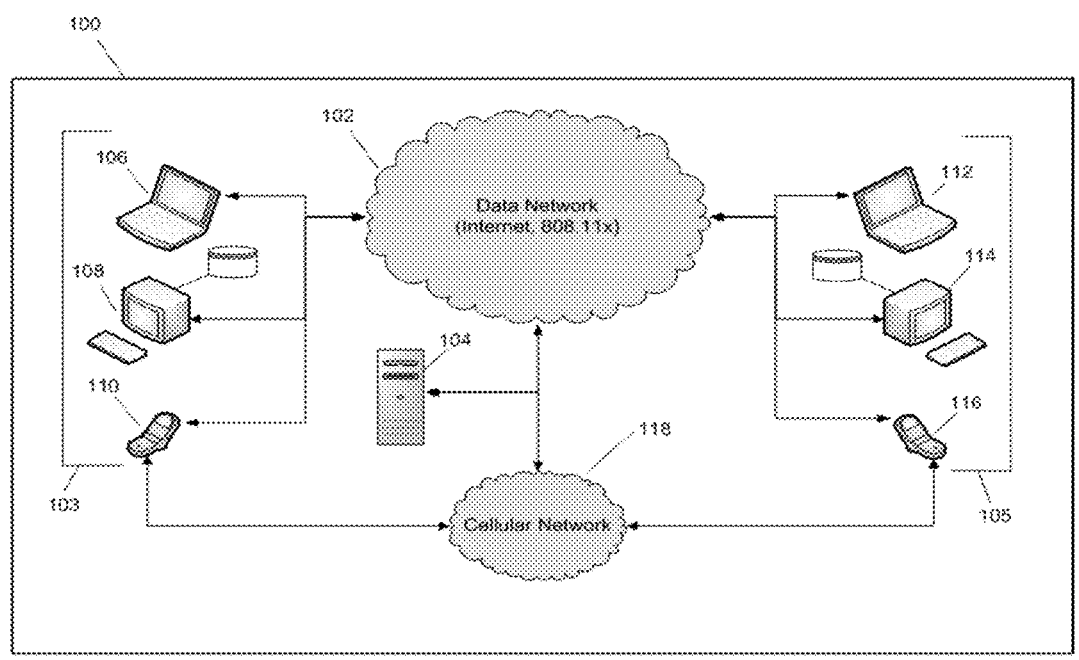
FIG. 1 shows a network in accordance with an embodiment of the present disclosure.

The current disclosure is related to U.S. patent application Ser. No. 12/505,109, entitled "SYSTEM, METHOD, AND COMPUTER-READABLE MEDIUM FOR AUTOMATIC QUERY AND ORDER PROCESSING VIA THE INTERNET" filed on Jul. 17, 2009, U.S. patent application Ser. No. 12/511,112, entitled "METHOD AND APPARATUS OF CREATING ELECTRONIC FORMS TO INCLUDE INTERNET LIST DATA" filed on Jul. 29, 2009, and U.S. patent application 61/317,788, entitled "DYNAMIC COLLABORATION AND DOCUMENT-MANAGEMENT PLATFORM" filed on Mar. 26, 2010, U.S. patent application 61/317,535, entitled "SMART MESSAGING SYSTEM" filed on Mar. 25, 2010 and U.S. patent application 61/317,541, entitled "VOICE BASED SOCIAL MEDIA"

filed on Mar. 25, 2010 and U.S. patent application 61/317,805, entitled "AUTOMATIC POSTING TO MEDIUMS WITH A USER'S CURRENT INTERESTS" filed on Mar. 26, 2010 and U.S. patent application 61/317,817, entitled "LIMIT AND FILTER INCOMING DATA PRESENTED TO A USER" filed on Mar. 26, 2010. The disclosure of each of these are incorporated herein in their entity by cross-reference.

The disclosure now U.S. patent application 61/317,788, entitled "DYNAMIC COLLABORATION AND DOCUMENT-MANAGEMENT PLATFORM" filed on Mar. 26, 2010, referenced above establishes a method to gather knowledge from aspects of the user's online surfing history and other places, and using this knowledge, recommends components on a particular medium that is being created, rather than relying on the user to provide input to attempt to achieve the result.

The medium created can be one or more of a web page, a blog, a twitter message, an IM, a social networking application such as a Facebook application, etc. Depending on the medium being created, the components recommended will vary. For instance, if a webpage is the medium being created, one component may be a dropdown list that includes elements that reflect the results of querying and utilizing the user's data. Another component on a webpage may be a table that includes any data encountered from the results in querying the user's data. If the medium is an instant messaging type of account, such as Twitter, the component would be a text message (and one that is shorter than 144 characters in the case of Twitter). If the medium is a blog, the component could be any relevant information (such as video, photos, text, etc.) from the result of querying the user's data.

The above-referenced disclosure now U.S. patent application 61/317,788, entitled "DYNAMIC COLLABORATION AND DOCUMENT-MANAGEMENT PLATFORM" filed on Mar. 26, 2010, discloses using the results from querying the local and remote systems to generate components on the medium. The present disclosure utilizes the functionality of the above referenced disclosure, but goes further in automating the process of creating a medium on a network, such as the Internet, as well as automatically propagating the data on the medium to the user's acquaintances.

Additional functionality described herein includes suggesting a topic or category of the medium by utilizing current interests of the user received from querying local and remote systems, automatically populating the medium with content from the user's data received from querying the local and remote systems, establishing communication of the new medium with the user's acquaintances or with users that have a similar interest, and automatically throttling the communication by removing acquaintances that do not respond to messages.

FIG. 1 displays a network architecture that may be used with an embodiment of the present disclosure. The network architecture 100 allows a user utilizing a client machine 103 to access one or more applications configured to perform the methods of the present embodiments as will be described below. The applications may take the form of software, for example to be downloaded from the server 104 or that currently resides on the client's machine 103. The client machine can be any of a mobile laptop device 106, a personal desktop computer 108, a wireless device 110 or any other personal computing device. The client machine 103 is connected to the Internet 102 or a similar communications network.

Figure 2:
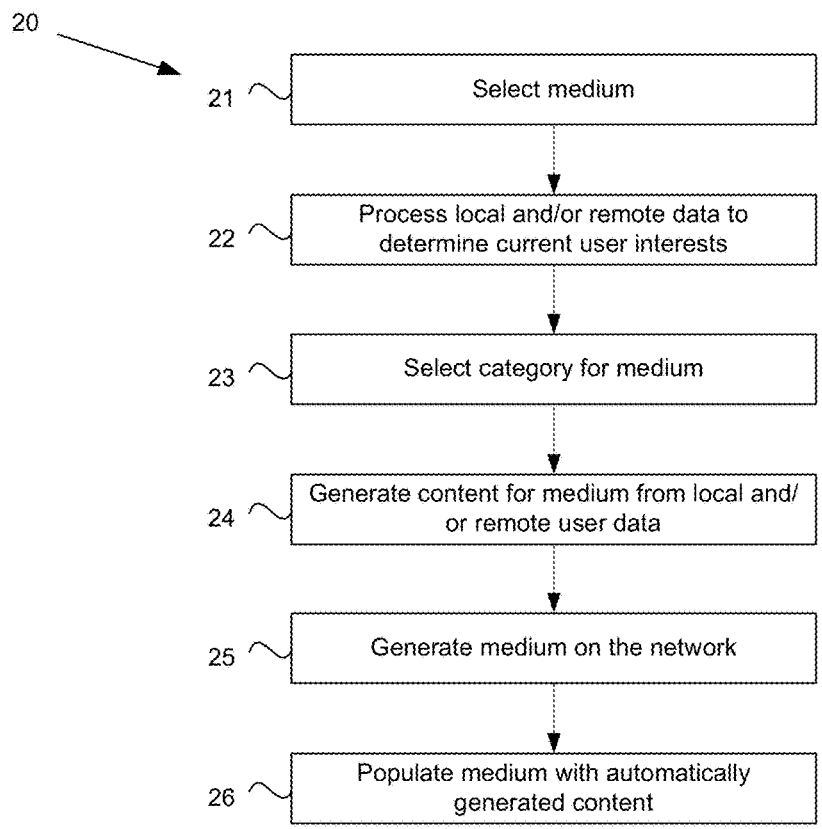
FIG. 2 shows a method for generating a medium on the network of FIG. 1.

In FIG. 2, there is shown a process 20 for generating a medium on a network. The process 20 commences by selecting a medium to be created (step 21). Local and/or remote user data is then processed to determine and suggest the current interests of the user (step 22). A category or topic for the medium is then selected from the current interests (step 23). The local and/or remote data is again queried to automatically generate content for the medium (step 24) after which the medium is generated (step 25) and populated with the automatically generated content (step 26).

By example only, an application used for enacting the above described method could reside on the server 104 but could also reside completely or in a distributed manner on one or more of the devices or networks in FIG. 1. The user may access the client machine 103, and connect to a remote machine 105 which includes any of a mobile laptop device 112, a personal desktop computer 114, or a wireless device 116. The remote machine 105 is connected to the Internet 102. If the client is on a wireless device 110/116, the system 104 can be accessed via the Internet 102, or the Wireless Network (such as a Cellular Network, for example) 118. It should be noted that other types of devices, in addition to devices 103 and 105, might be used with the present embodiments. For example, a PDA, an MP3 player, a gaming device (such as a hand held system or home based system) and the like that can also transmit and receive information could be used.

Figure 3:
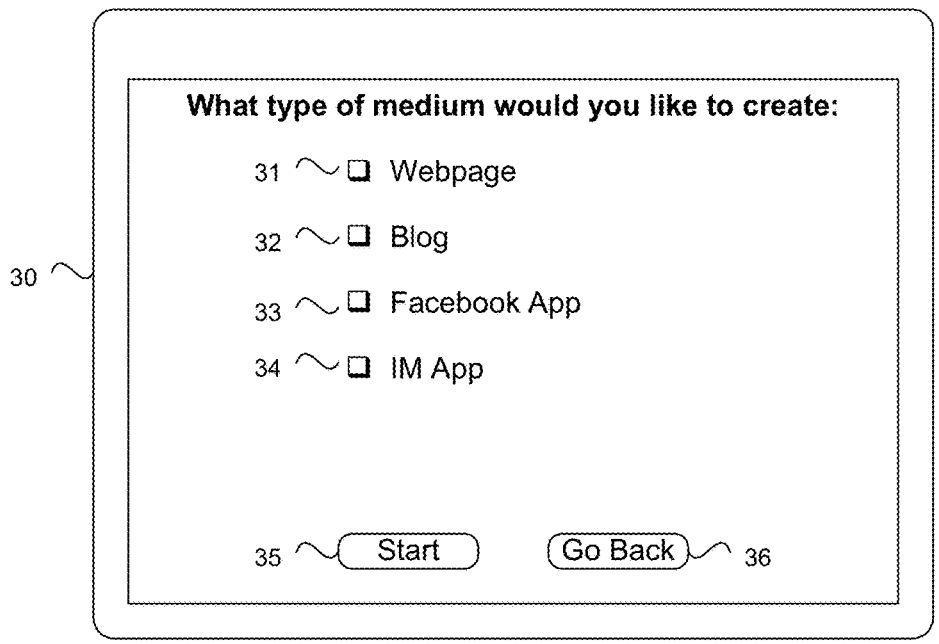
FIG. 3 shows an top level window of a medium generation application.

The user will interface through a GUI that is presented when the application is executed. The GUI is accessed via one or more of the devices 103. An interface screen 30 that allows the user to indicate the medium of interest is depicted in FIG. 3. The interface screen 30 shows selections for a webpage 31, a blog 32, a social networking page (e.g. Facebook) 33, and an instant messaging application (e.g. Twitter application) 34. Many more mediums can be present but are not depicted such as a Photo Sharing application, a Data Sharing application, a Cellular Telephone application, etc.

The user selects the medium or mediums desired and presses the "Start" button 35 to begin the functionality of the application, or presses the "Cancel" button 36 to end the application. In other embodiments, the medium or desired mediums can automatically be picked based on a level of activity in a certain area as will be described below. For example, the application, when parsing through the user's local files, specifically the temporary internet files, can note that the user continuously access other users' blogs and thus ascertains that the current user would want to create a blog. In other embodiments, utilizing the user's historical surfing history, the mediums are presented in the Application Top Window, e.g. interface screen 30, in the order that the user would likely be most interested in. The application keeps track of which mediums the user has created (in a memory of the server 104, for example) and if the user runs the application again, the already created application will not appear again, or will appear at the bottom of the list in case the user wants to create a similar medium (such as another blog covering a different topic, for example).

Assuming that the user continues, by pressing the "Start" button 35, the application utilizes the logic described in U.S. patent application 61/317,788, entitled "DYNAMIC COLLABORATION AND DOCUMENT-MANAGEMENT PLATFORM" filed on Mar. 26, 2010, to gather current interests of the user from both the local and remote systems. As described in Ser. No. 61/317,788, the application gathers the data of the user based on one or more of the following elements:

ads that have been served to the user's email program
ads that the user clicked on
searches requested
groups that the user is a member of
emails that the user sent or received
calendar events that the user is subscribed to
historical surfing habits
current location of the user
online games that the user has shown interest in
DVR
live video streaming/IPTV
web based shows
GPS (Cellular)

Other elements that may be searched to provide an indication of a user's current interests may be apparent to a person skilled in the art and are intended to be encompassed herein.

One way to use the history of the user's online surfing is through the history on the user's computer. Most web browsers retain Internet surfing information in the form of cache files, or cookies stored on the user's computer. These files can be scanned to determine information that will aid the application in creating a dynamic web page.

Other methods can be employed to gain an understanding of the user's previous Internet surfing history. Google and Yahoo, for instance, offer free services that users can utilize to perform email capabilities, manage groups, search the web, manage advertisements, manage calendar activities, manage documents, as well as many other services. Data associated with these services can be interworked with the current embodiments to aid in making choices in the components of the created page.

In another embodiment, using the location of the user, the application can tailor the created page. The location of the user can be found using different methods. One way is to compare the IP address to a broad geographical location. This method may not give an exact location, but should provide an approximation of the location. Another method is to examine the search history, groups joined, direction information provided to and/or received from map applications (for example, an address that recurrently appears in the TO: field) and ads appearing near the emails or searches performed, looking for any address information.

Figure 4:
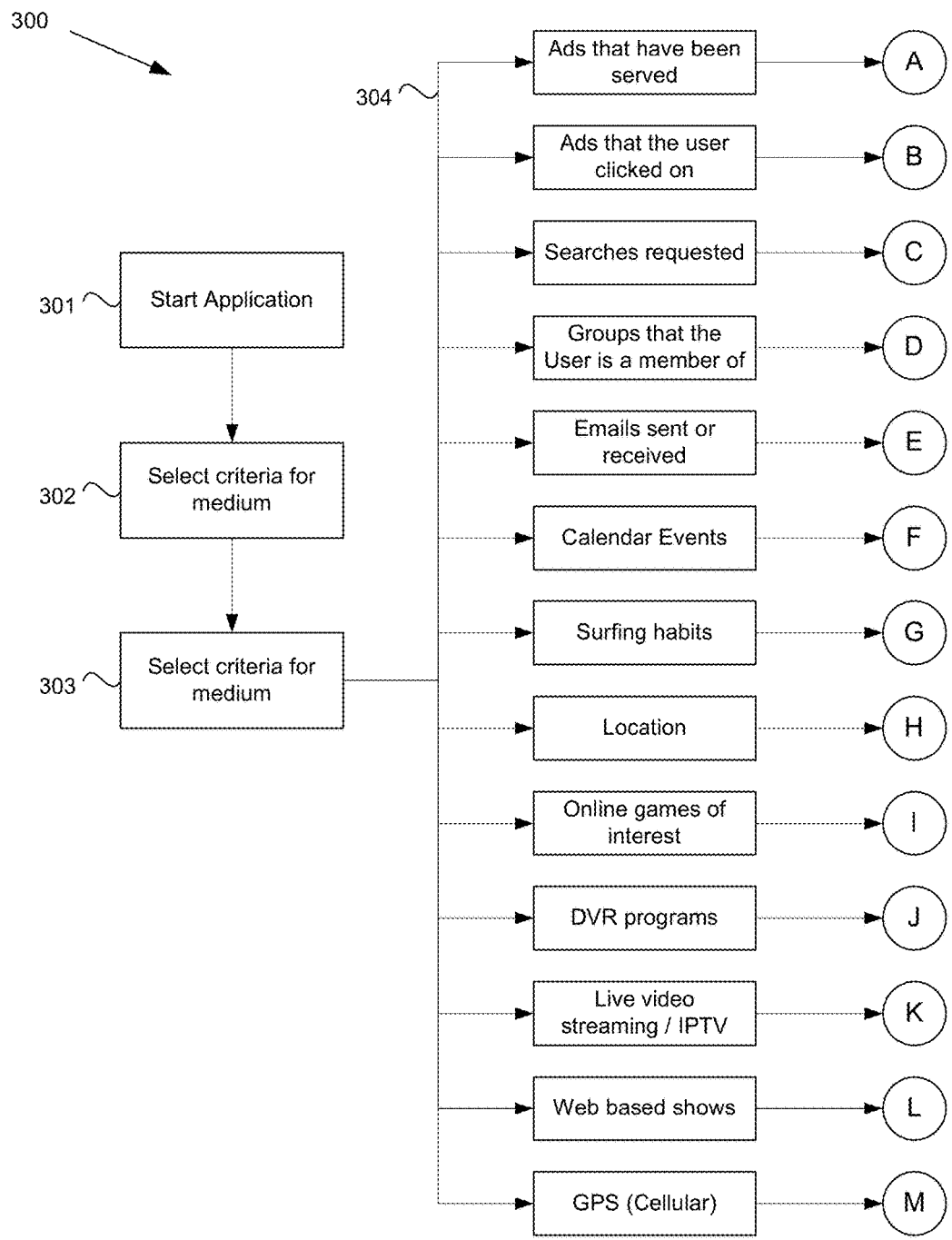
FIG. 4 shows a process of the medium generation application.

FIG. 4 shows an overall flow 300 of the system. The application starts at step 301 by displaying the interface screen 30 of FIG. 3. When the user selects a medium and selects the start button 35 (step 302), the application selects criteria for the selected medium (step 303) and begins the process of collecting data on the user from both the local and remote systems based on one or more of the elements listed above (step 304). For example, processing of ads that have been served follows a process "A", processing of ads that the user clicked on follows a process "B" etc, each of which are described in more detail below.

Figure 5:
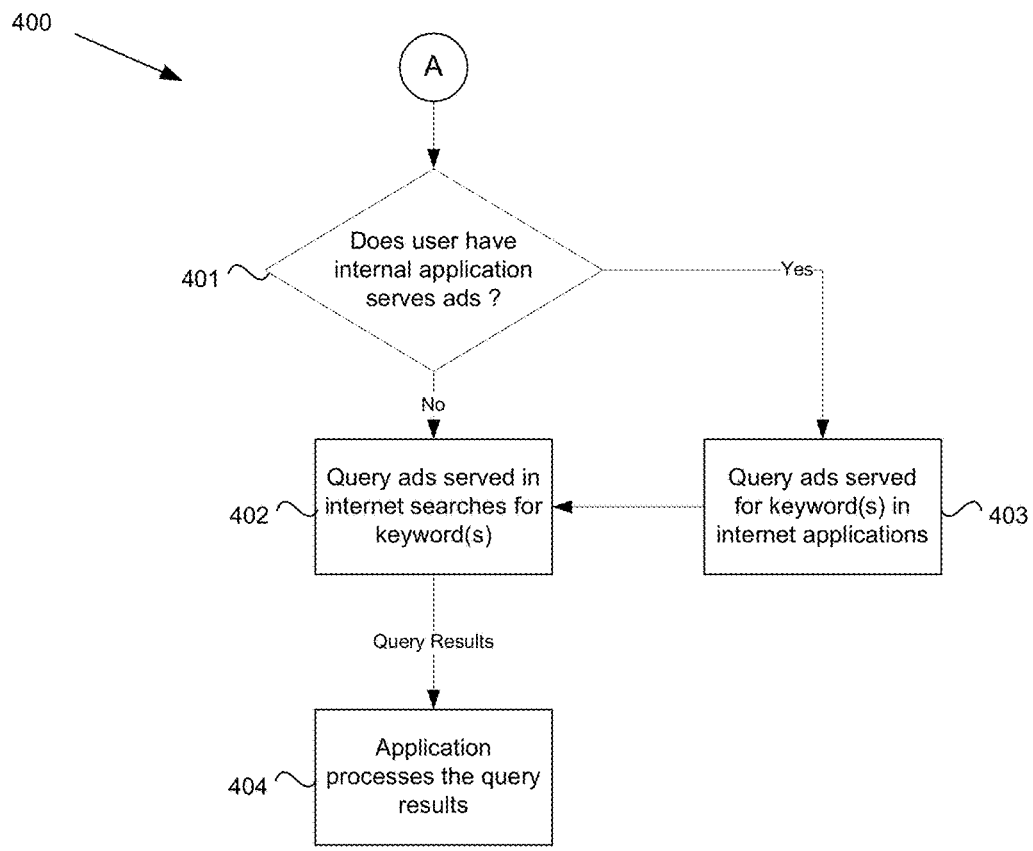
FIG. 5 shows a process for querying served ad data.

FIG. 5 depicts a process 400 representing process "A" undertaken by the application for gathering user data from ads that have been served. First a check is made to determine if the user has an internal application that serves ads (step 401). This would be a local application used to deliver ads to the user. If there is a local application, the list of served ads is queried for keyword(s) (step 402). The application will then query the remote system's (Google, for instance) list of ads served to the user using the remote data server that is internal to the remote system (step 403). In either case, the results of the query are returned to the application which processes the query results (step 404).

Figure 6:
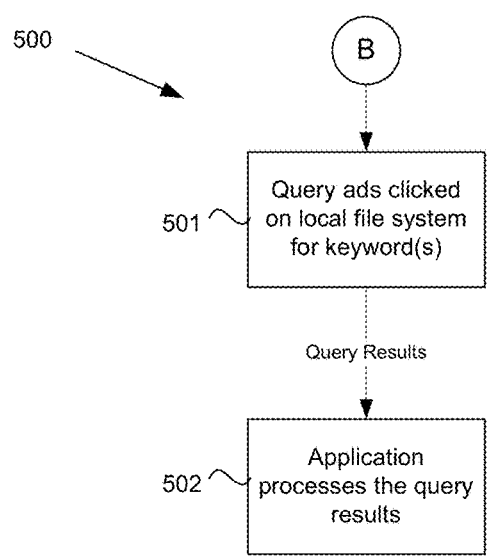
FIG. 6 shows a process for querying clicked ad data.

FIG. 6 depicts a process 500 representing process "B" undertaken by the application for gathering user data from ads that the user has clicked on. The local file system (cookies and temporary internet files) is searched for advertisements that the user has previously clicked (step 501). The found websites are searched for keyword(s) and the results of the query are returned for processing by the application (step 502).

Figure 7:
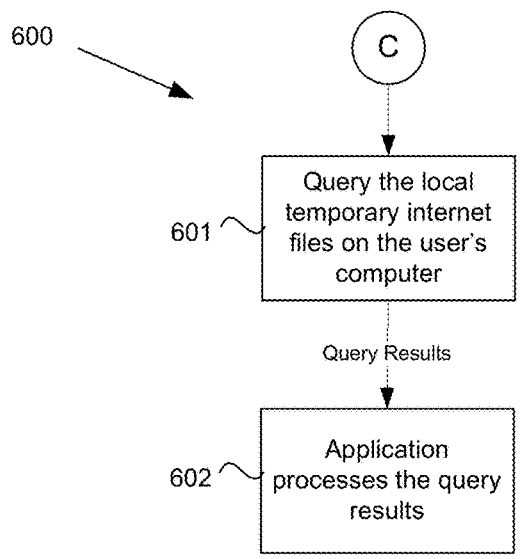
FIG. 7 shows a process for querying temporary internet file data.

FIG. 7 depicts a process 600 representing process "C" undertaken by the application for gathering user data from searches requested. The local file system (cookies and temporary internet files) is searched for the internet searches requested by the user (step 601). The history of what the user has searched for is stored in the Internet history stored on the local computer. The search history is searched for keyword(s) and the results of the query are returned for processing by the application (step 602).

Figure 8:
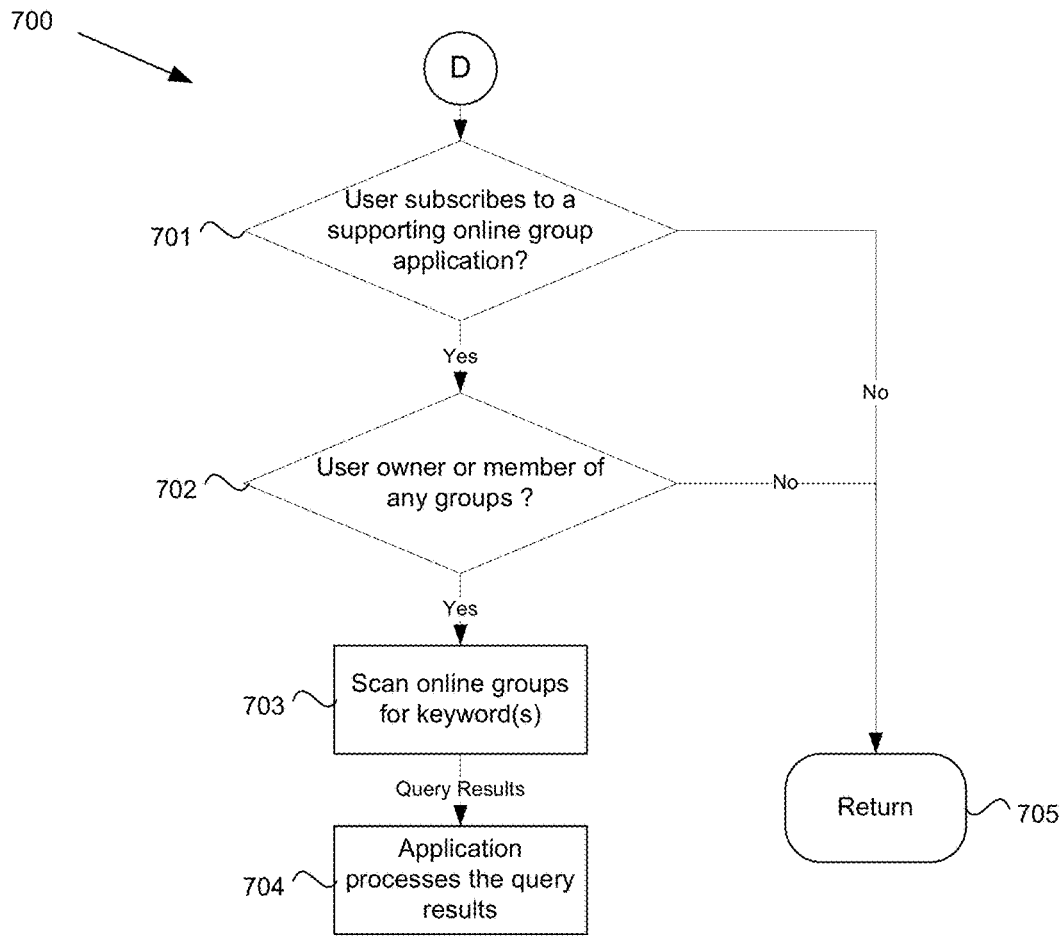
FIG. 8 shows a process for querying online group subscription data.

FIG. 8 depicts a process 700 representing process "D" undertaken by the application for gathering user data from groups that the user is a member of. A check is first made to determine if the user has subscriptions to an online group's application (i.e., Google, or Yahoo) (step 701). If the user does not subscribe to an online group, the process returns as all group applications are online (step 705). If the user does subscribe to an online groups application and the user is the current owner or member of a group (step 702), the group's data is searched by querying the remote system's (Google or Yahoo, for instance) data of groups wherein the user is an owner or member (step 703). The remote data server that is internal to the remote system may be searched. The result of the query is returned for processing by the application (step 704).

Figure 9:
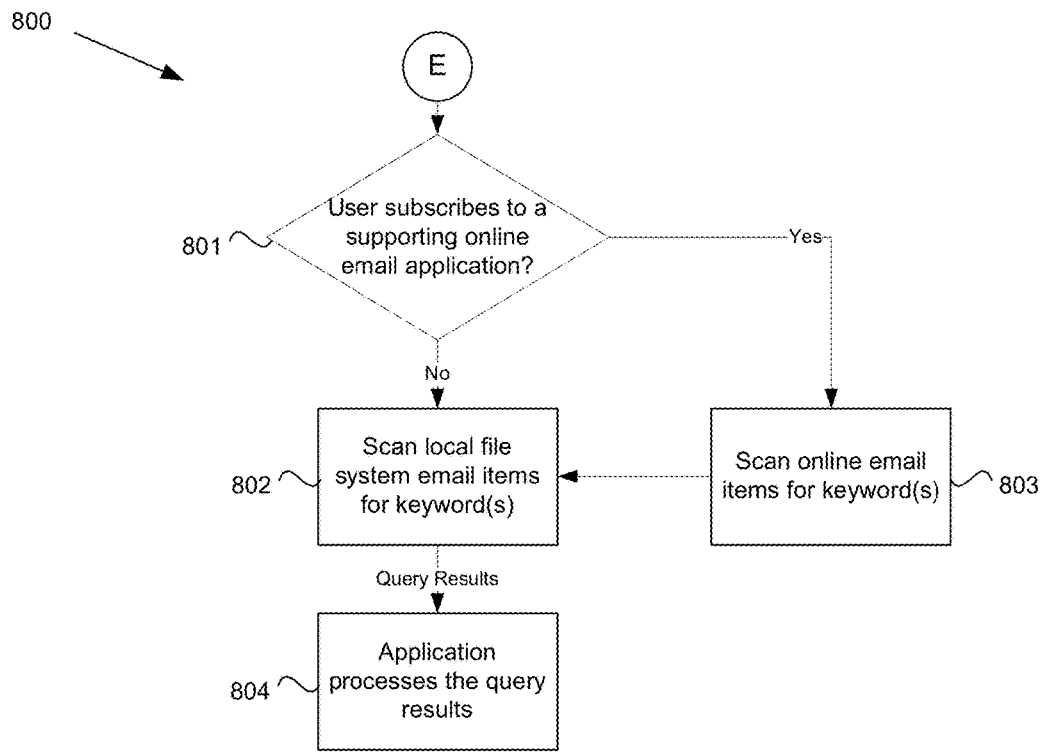
FIG. 9 shows a process for querying email application data.

FIG. 9 depicts a process 800 representing process "E" undertaken by the application for gathering user data from emails sent and/or received. A check is first made to determine if the user has subscriptions to an online email application (i.e., Google, or Yahoo) (step 801). If the user does have an online email application, the email is scanned for keyword(s) (step 803). This functionality would be internal assuming that the application resided in the Google or Yahoo application, or any other online email provider. If the user does not subscribe to an online email application but uses an application that stores the history of the emails locally on the user's local system, the application scans the emails on the local computer (step 802). Developer applications exist to scan mail folders that are stored on the user's local computer. The result of the query is returned for processing by the application (step 804).

Figure 10:
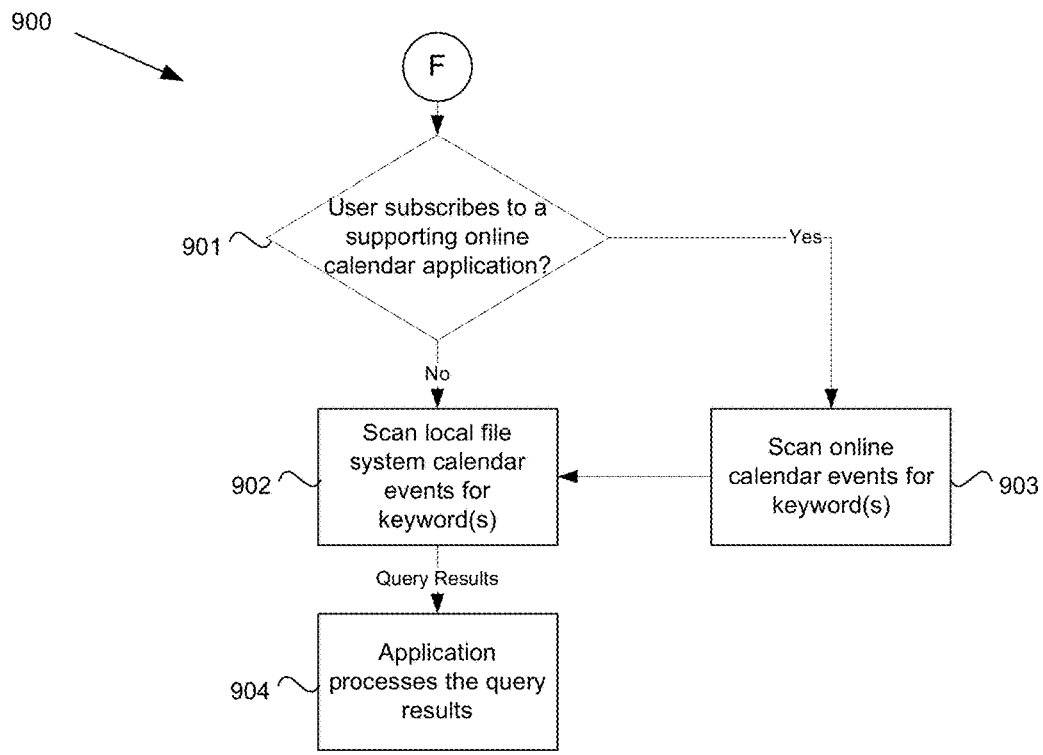
FIG. 10 shows a process for querying calendar application data.

FIG. 10 depicts a process 900 representing process "F" undertaken by the application for gathering user data from calendar events. A check is first made to determine if the user has subscriptions to an online calendar application (i.e., Google, or Yahoo) (step 901). If the user does have an online calendar application, the calendar items are scanned for keyword(s) (step 903). This functionality could be internal assuming that the application resided in the Google or Yahoo application, or any other online calendar provider. If the user does not subscribe to an online calendar application but uses an application that stores the history of the calendar items locally on the user's local system, the application scans the calendar items on the local computer (step 903). Developer applications exist to scan calendar folders that are stored on the user's local computer. The result of the query is returned for processing by the application (step 904).

Figure 11:
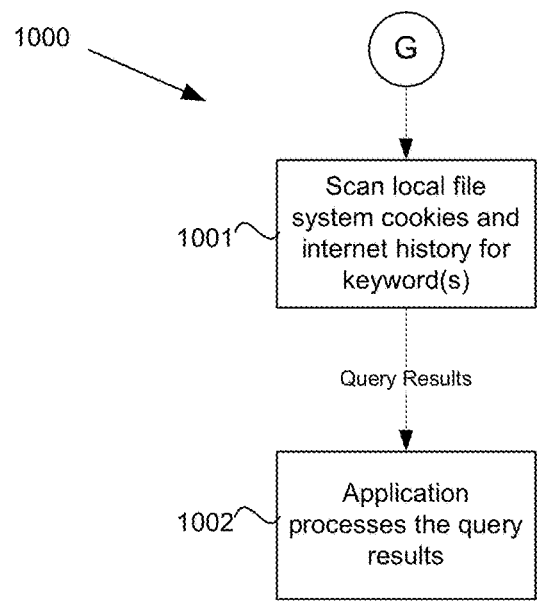
FIG. 11 shows a process for querying internet surfing history data.

FIG. 11 depicts a process 1000 representing process "G" undertaken by the application for gathering user data from the user's surfing habits. The local file system (cookies and temporary internet files) is searched for the internet surfing history of the user (step 1001). The history of the user's Internet surfing is stored in the Internet history stored on the local computer. The Internet history is searched for keyword(s) and the results of the query is returned for processing by the application (step 1002).

Figure 12:
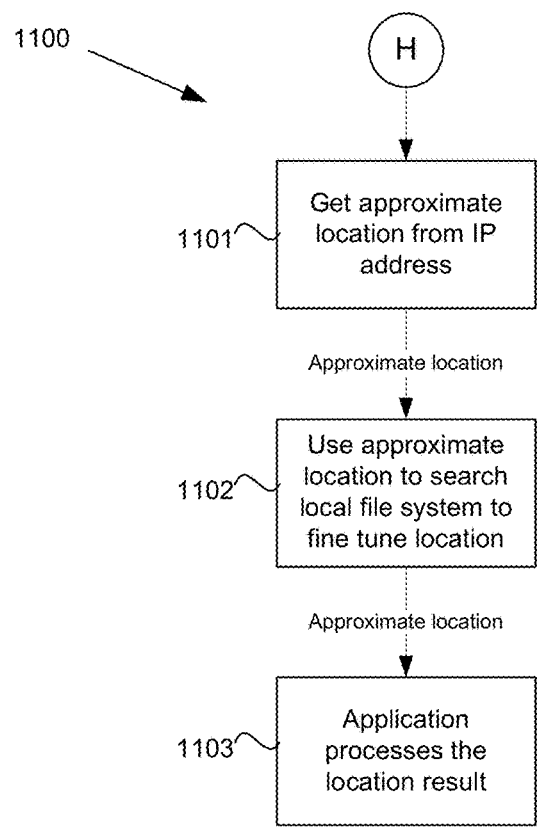
FIG. 12 shows a process for querying location data.

FIG. 12 depicts a process 1100 representing process "H" undertaken by the application for gathering user data from the user's location. The current IP address is sought from the local system, and the approximate location is obtained using the IP address (step 1101). The geographic location can be determined from the IP by utilizing external services like hostip.info and other similar services. After the approximate location is determined, this information is then used to scan the local file system to determine a more exact location by scanning through the cache and temporary internet files (step 1102). This location is returned to the application for processing (step 1103).

Figure 13:
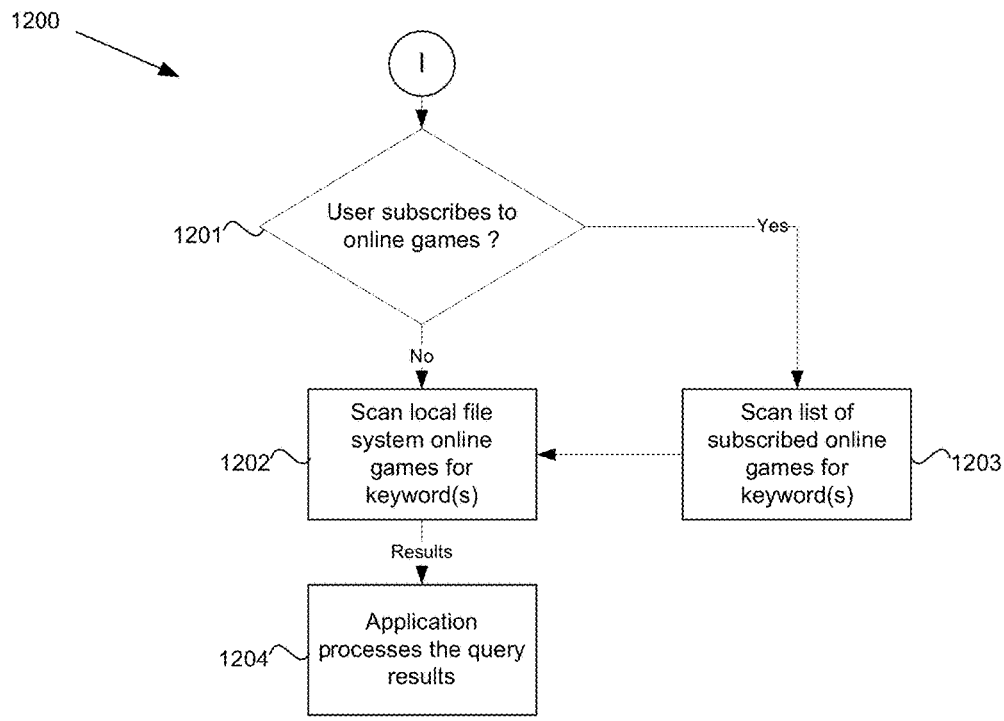
FIG. 13 shows a process for querying online games data.

FIG. 13 depicts a process 1200 representing process "I" undertaken by the application for gathering user data from online games of interest to the user. A check is first made to determine if the user has subscriptions to an online gaming application (step 1201). If the user does have an online gaming application, the gaming data is scanned for keyword(s) (step 1203). This functionality would be internal assuming that the gaming application resided in the Google or Yahoo application, or any other online gaming provider. If the user does not subscribe to an online gaming application but uses an application that stores the games locally on the user's local system, the application scans the gaming data on the local computer (step 1202). Developer applications exist to scan various folders that are stored on the user's local computer. The result of the query is returned to the application for processing (step 1204).

Figure 14:
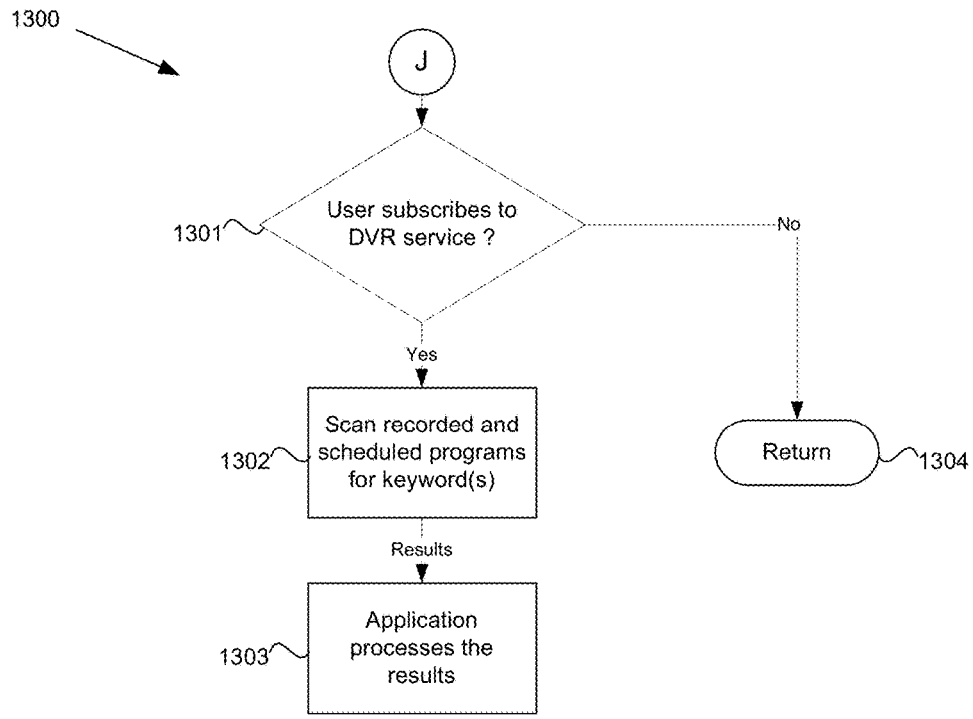
FIG. 14 shows a process for querying DVR service data.

FIG. 14 depicts a process 1300 representing process "J" undertaken by the application for gathering user data from DVR programs and the like. A check is first made to determine if the user has subscriptions to an online DVR service (step 1301). If the user does not subscribe to an online DVR service, the process returns as all DVR services are online (step 1304). If the user has an active subscription to an online DVR service application, the DVR data is scanned for keyword(s) (step 1302). Depending on the provider of the DVR data, the data can be made available by an external API provided by the company of the DVR application. If no API is available, the data can be obtained by various websites wherein the DVR subscription resides. The result of the query is returned to the application for processing (step 1303).

Figure 15:
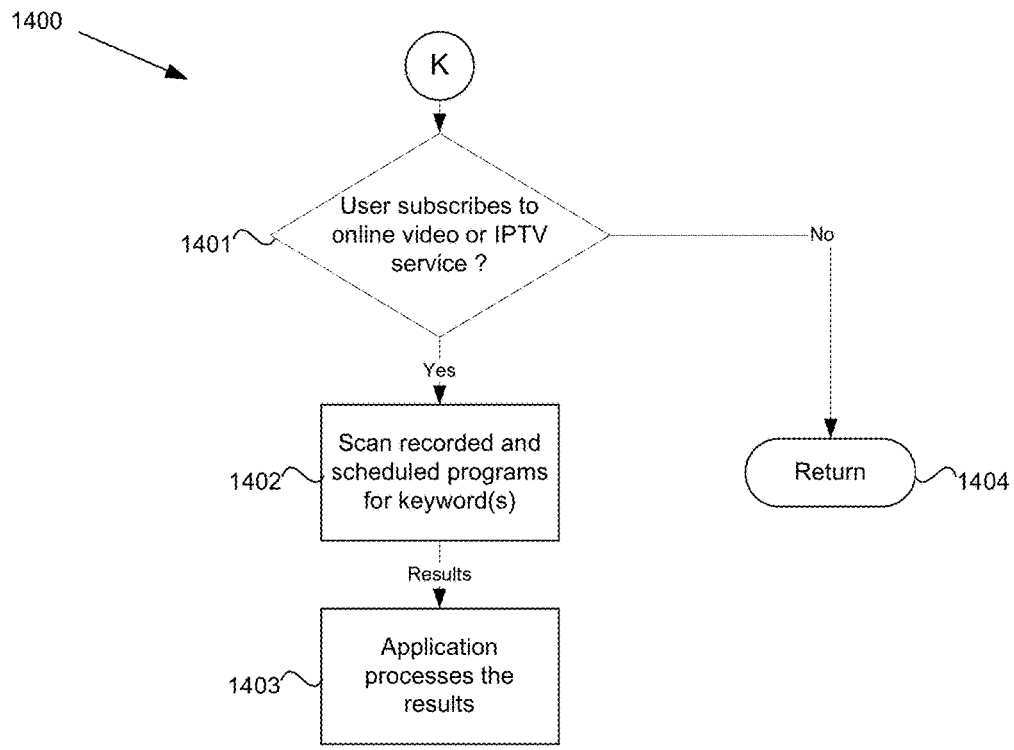
FIG. 15 shows a process for querying online video service or IPTV data.

FIG. 15 depicts a process 1400 representing process "K" undertaken by the application for gathering user data from live video streaming, IPTV and the like. A check is first made to determine if the user has subscriptions to live video streaming or IPTV (step 1401). If the user does not subscribe to a live video streaming or IPTV, the process returns (step 1404), as all video streaming is online. If the user has an active subscription to an online video streaming or IPTV service, the recorded and scheduled data is scanned for keyword(s) (step 1403). Depending on the provider of the live video streaming and IPTV data, the data can be made available by an external API provided by the company of the live video streaming or IPTV application. If no API is available, the data can be obtained by various websites wherein the live video streaming or IPTV subscription resides. The result of the query is returned to the application for processing (step 1403).

Figure 16:
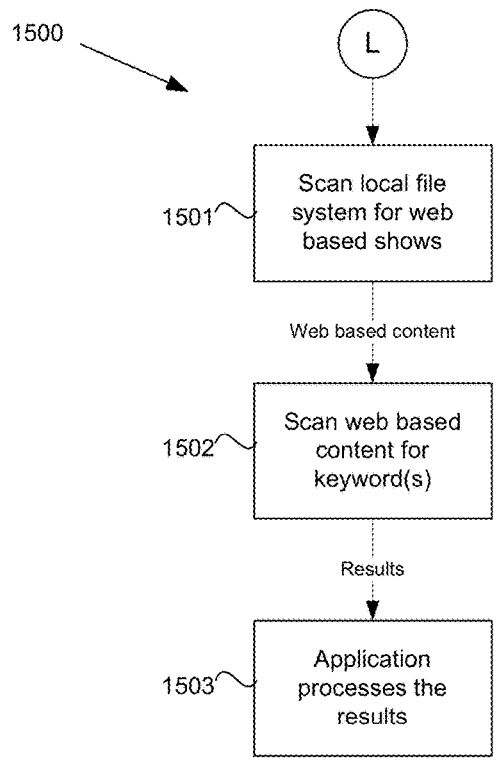
FIG. 16 shows a process for querying web-based shows data.

FIG. 16 depicts a process 1500 representing process "L" undertaken by the application for gathering user data from web based shows. The local file system is searched for data pertaining to any web based shows that the user may have stored (step 1501). The data is then scanned for keyword(s) (step 1502) and the results are returned to the application for processing (step 1503).

Figure 17:
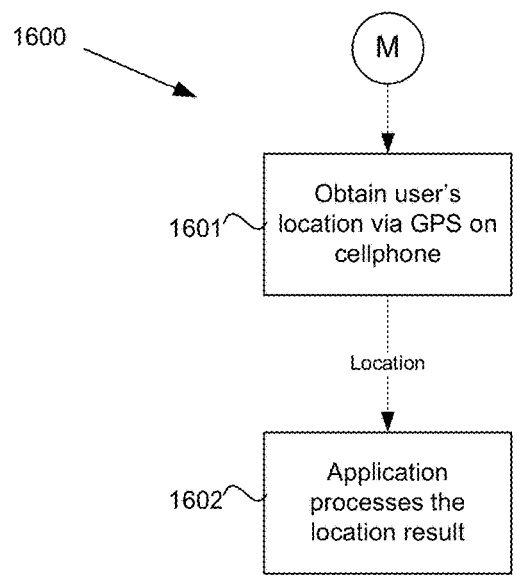
FIG. 17 shows a process for querying GPS location data.

FIG. 17 depicts a process 1600 representing process "M" undertaken by the application for gathering user data from GPS (cellular). The location is received by utilizing GPS on the user's mobile device (step 1601). Applications residing on mobile devices can utilize location-based services, as the devices that contain GPS provide APIs that allow interaction for location based services. The location is returned to the application for processing (step 1602).

As described in the Applicant's co-pending patent application now U.S. patent application 61/317,788, entitled "DYNAMIC COLLABORATION AND DOCUMENT-MANAGEMENT PLATFORM" filed on Mar. 26, 2010, referenced above, weights may be assigned to the results obtained as described above that give preference to certain types of query results over others, depending on how the system is configured.

After querying the user's local and remote systems, the results are analyzed, including applying any weightings, and key words are sought out that reflect the current interests of the user. The results from both the local and remote systems may be stored in a temporary text file. Information that may be stored for the different data types may be as follows:

Ads Clicked—the URL of the websites and any text, images and/or video associated with the advertisement;

Ads Served—the URL of the websites and any text, images and/or video associated with the advertisement;

Request Searches—the text that the user entered into the search engine;

Groups—the group titles and any text, images and/or video associated with the group description;

Emails/IMs/SMSs—the title and body of the emails and the data in the IMs and SMS msgs;

Calendar—the title of the calendar events and any associated text describing the event such as a location, date, time, duration, call-in data, participants, etc.;

Surfing History—the URL of the websites and any associated description stored about the websites as well as amount of time spent on the site, on each page of a site, etc.;

Location—the most specific description of the location that can be determined based on an IP address, a known address, product ordering history, etc.;

Games—the title of the games and any associated descriptions;

Video—the title of the video and any associated descriptions; and

GPS—the most specific description of the location that can be determined.

In another embodiment, the temporary text file is searched by the application of the invention for similarities. APIs are published that convert text into indexable/searchable tokens. One such API is the Java Package: org.apache.lucene.analysis. This Package implements tokenization—namely breaking of input text into small indexing elements or tokens. Some of the other analysis tools included in the Java package include:

Stemming—Replacing the words by their stems. For instance with English stemming "bikes" is replaced by "bike"; now query "bike" can find both documents containing "bike" and those containing "bikes".

Stop Words Filtering—Common words as "the", "and" and "a" rarely add any value to a search. Removing these shrinks the index size and increases performance. It may also reduce some "noise" and actually improve search quality.

Text Normalization—Stripping some or all accents and other character markings can make for better searching.

Synonym Expansion—Adding in synonyms at the same token position as the current word can mean more accurate matching when users search with words in the synonym set.

Utilizing a tokenizer program, main words from the temporary text file are stored and analyzed for repetition. The application analyzes (or together with another application running on at least one of the devices depicted in FIG. 1) text in a document for various occurrences. For example, using the Java tokenizer, the following code will tokenize a sentence:

```
String speech="Four score and seven years ago";
StringTokenizer st=new StringTokenizer(speech);
while (st.hasMoreTokens( )) {
   println(st.nextToken( ));
}
```

The resulting output of the above code would be:
Four
score
and
seven
years
ago

Figure 18:
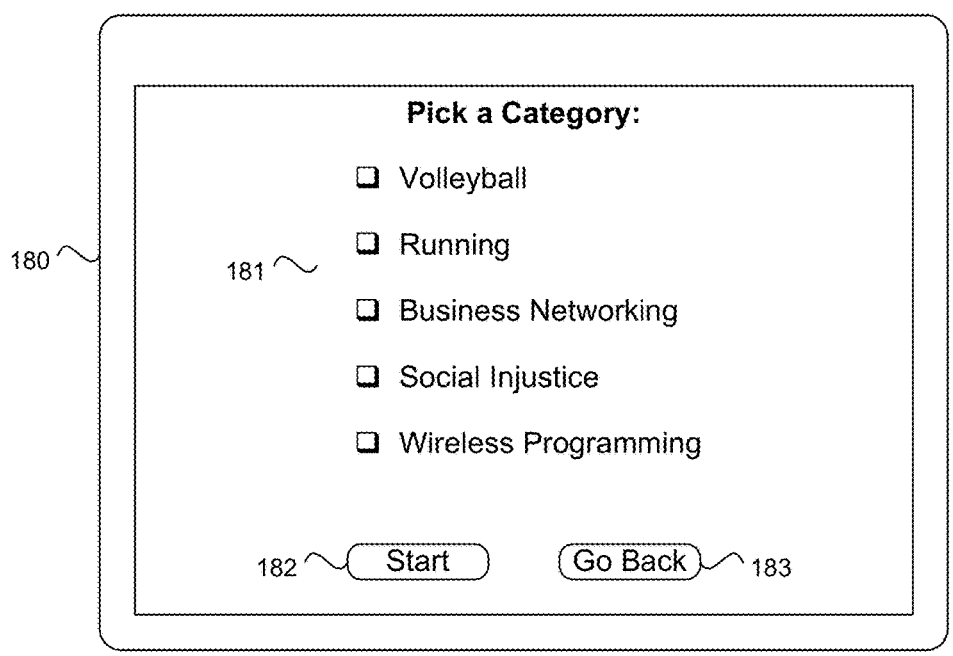
FIG. 18 shows a category list interface presented by the medium generation application.

Once the text is tokenized, it is analyzed for repetitious words, or apparent categories. The main categories found after analyzing the results of the queries are placed in a dropdown component and included in a Category List Window. In other embodiments, these categories can be presented in a drop down menu or in any other manner that can be viewed and/or acted upon by the user. FIG. 18 is an example GUI of a Category List Window 180 showing the categories the application displays to the user. The application presents a list of possible categories 181 for the new medium using the main topics found from the queries. The user selects a category or categories from the list 181 and presses the "Start" button 182, allowing the functionality to continue. The user can also press the "Go Back" button 183 to return to the previous window or can pick a category with a "Pick Your Own Category" option (not shown).

In another embodiment, the list of categories presented to the user is listed from the most popular at the top and the least popular at the bottom of the list. In another embodiment, the application does not present the list of categories to the user, but decides the category by utilizing the top (or most present) category after analysis of the temporary text file.

Figure 19:
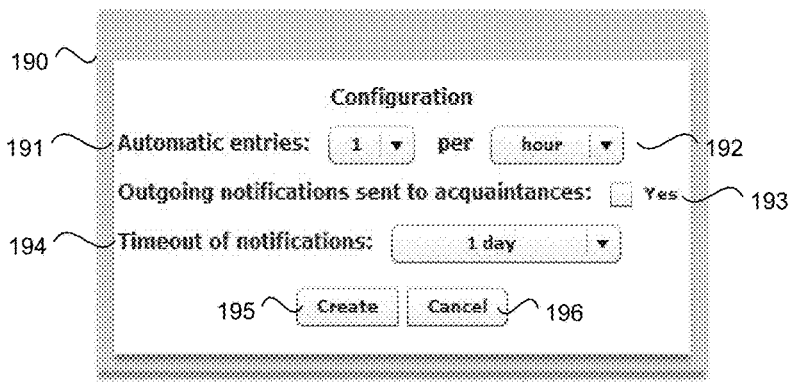
FIG. 19 shows a configuration interface presented by the medium generation application.

The application then allows the user to configure the medium. A sample interface 190 for configuring the medium is shown in FIG. 19. Through the interface 190, the user is able to configure various functional parts of the application that generates the medium including the number 191 and rate 192 of automatic entries, whether notifications of updates are sent to acquaintances 193 and a timeout for notifications 194. The options to configure in this example GUI 190 are only a sample of options that could be available. Additional options can be added and/or some of the current options can be subtracted from this example as will be apparent to a person skilled in the art.

The number 191 and rate 192 options of the configuration window 190 allow the user to specify the number and rate of automatic entries (including minutes and seconds, not shown) posted into the newly created medium. The next setting allows the user to specify if outgoing notifications are automatically sent to the individuals associated with the user. If the checkbox 193 is set, outgoing messages will be sent out.

Using these configuration parameters the application may be configured to handle automatic entries into the medium using the data found from the local and/or remote system search (which may be a one-time, a predetermined amount of times, or as a continuous search). For example, the application can automatically provide posts to the user's medium (which has just been created or which was previously created), such as blog posts to the user's blog based on information from at least one of the elements presented above (such as ads served, emails, GPS data, etc.). The application also uses the configuration parameters to manage the sending of outgoing messages automatically to individuals associated with the user, such as the user's acquaintances or individuals the user is interested in providing such information to, or who have expressed an interest in receiving such information, or who are currently receiving such information. The application may attempt to push data from the new or existing medium to one or more of the individuals referenced above. This occurs without the user's specification, but can be monitored by the user, or can be entirely turned off. The individuals may be found by any of the following: location of the user, remote information of the individuals, previous messages sent to/from the user to/from the individuals, etc.

The timeout window 194 of the configuration interface 190 allows the user to specify the time to allow the acquaintances to respond to the automatic message before the application will cease the sending of further notification messages.

In another embodiment, an encrypted text file external to the application is made available wherein the configuration settings can be configured outside of the running application. This text file is a file where the configuration element is provided (one per line), followed by "=", then the setting. For instance:

AUTOENTRIES=2PERDAY
TIMEOUTNOTE=1DAY
TIMEOUTNOTE=1WEEK

In another embodiment, the timeout for notifications are set automatically, determined based on the historical response times by the user and the acquaintance, the user and a similar acquaintance, the average response time based on all users executing the application, the average response times based on all users utilizing the particular category, the average response time based on certain users exhibiting/ utilizing features for establishing the content as described above, etc.

In another embodiment, the timeout period can automatically be extended if an acquaintance has previously responded. For instance, the timeout of notifications may automatically be increased to 2 days from 1 day if the acquaintance has previously responded. Also, the amount of responses and the elapsed time in between responses can be taken into account. For example, if the user and the acquaintance have each responded to one another on the same topic a number of times in a certain time frame with a small amount of time elapsed (a few minutes to a few days) in between responses, then the timeout of notifications may automatically be increased to 3 days or more from 1 day. This information and the logic to determine these increases is stored on at least one of the devices depicted in FIG. 1.

Once the user has made selections in the Configuration Window, if the "Create" button 195 is pressed, the Configuration Window is removed and the application begins to create the medium that was previously specified by the user. If the "Cancel" button 196 is pressed, the Configuration Window is removed and the application returns to the previous state.

In creating the medium, the application may include data from the results according to the user's choice in the Configuration Window. If an automatic entry is placed in the medium, the application may obtain the data from one or more of the following query results:

Calendar Event Titles and/or Descriptions;
Web page URLs and descriptions of ads served to the user;
Web page URLs and descriptions of ads the user clicked on;
Search terms entered by the user for searches;
Name of groups that the user is a member of;
Title and body of emails sent/received by the user;
City/State/Region of the user;
Title of games/video/streaming video that the user has interacted with.

There are sites available today allowing mediums of any nature to be created. A registration form typically needs to be filled out in order to create or to begin using a medium. The application of the instant embodiments will interact with the medium (for example, the website related to the medium) via a published API that is made available to developers/programmers. The API establishes a way for developers/programmers to give external applications the ability to log into the medium's website, as well as setting the ability to accept and submit data (such as text, photos, and video) into the medium, create an account in the medium. The interaction of the application of the current embodiments with the APIs of the mediums (such as websites including Facebook, Twitter, etc) is provided. This interaction will allow the current application to have seamless interaction with remote products, and give the application an intuitive user experience.

In another embodiment, when the medium is created the application will then have the option to automatically establish relationships to individuals associated with the user via Twitter, Facebook, MySpace, LinkedIn and other messaging and social network services by finding individuals/groups related to the medium's category.

The application utilizes APIs of popular applications (such as Facebook, MySpace, Twitter, etc) made available to developers to find individuals previously associated with the user and are related to the medium's category.

For instance, in social networking sites, such as the Facebook application, methods are exposed in the published API giving the ability to examine all of the comments of users that are friends of a user in Facebook. The following are some of the methods (in the Facebook API) allowing this functionality:

friends.get—Returns the identifiers for the current user's Facebook friends.
stream.getComments—This method returns all comments associated with a post in a user's stream.
users.getInfo—Returns a wide array of user-specific information for each user identifier passed, limited by the view of the current user.
comments.add Adds a comment for a given xid on behalf of a user. Calls with a session secret may only act on behalf of the session user.

Using these, and similar methods, the application first obtains a list of all Facebook friends of the current user of the application, then stores in a temporary file (such as a text file stored in 104, see FIG. 1), all of the comments posted on the user's Facebook wall. This temporary file is parsed and any users are found that have posted comments relating to the medium's category. The application can use the published APIs to automatically post messages to those users. These messages contain the content of the data that is posted inside the medium either automatically by the application, or manually via the user. A similar process is followed for each of the social networking applications wherein the user has an active account (MySpace, Twitter, etc).

Figure 20:
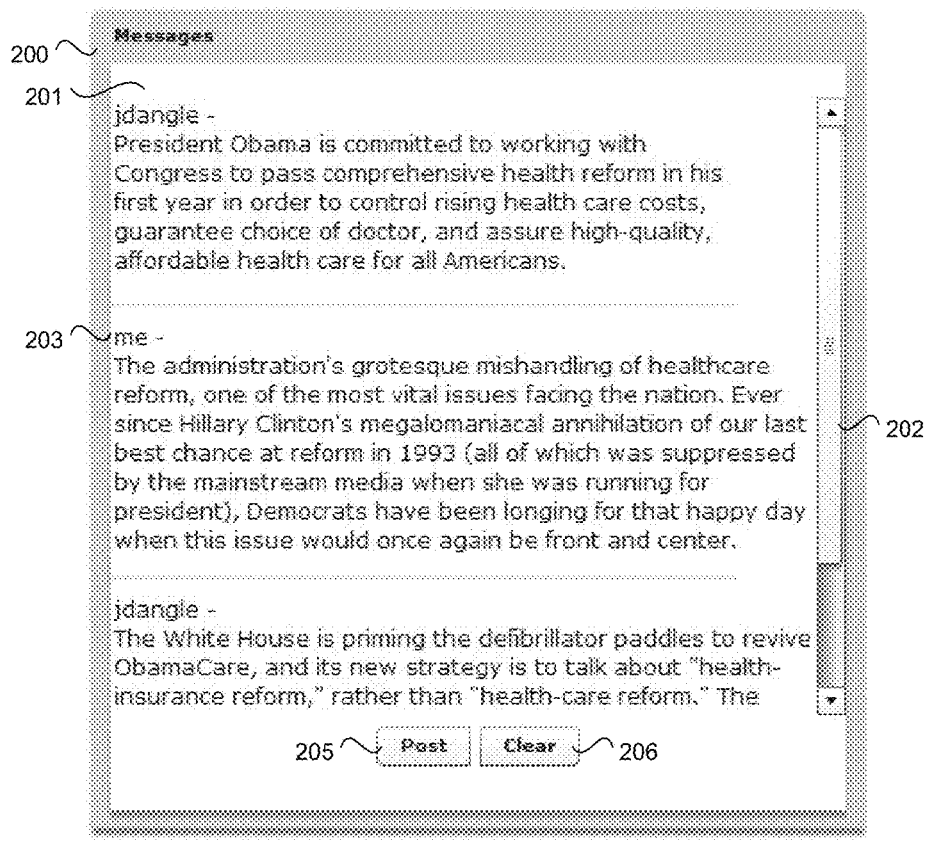
FIG. 20 shows a messaging window created by the medium generation application.

The individuals' responses are "placed inside" or provided to the medium for display as well. To avoid cluttering the medium with additional messages in-line with the existing content, they may not be directly in-line in the main section of the medium, but may be included in a sidebar where appropriate messages would be found. For instance, a new component 200 as shown in FIG. 20 and entitled "Messages" that consists of a Text box 201, a scrollbar 202, a listing of the message content 203 can be included on the medium, and a rolling display of the communication between the user and the acquaintance can be included therein. Also included below the message window is a button enabling the user to interact with messages. By example only, a button entitled "Post" 205 enables the user to post a response to the current message in the message window. Another button entitled "Clear" 206, for example, will clear out the messages in the window.

Each message that is sent out from the application has a configurable notation that is included (one or more of an icon, text, an image, video, a color or a sound) that may indicate that the message is not directly from the user, but automatically generated from the application. For instance, if the message is sent from the application to a blog, Twitter account, website, or any other webpage accepting messages, the name of the application will be appended to the user for the name or id of the person submitting the blog. Also, the name of the application can be replaced with the notation if the remote application's API accepts that format.

In one embodiment, a timer is set on every outgoing message to manage the individual(s). If 2-way communication is not established within the configurable amount of time, the relationship will be severed, and if 2-way communication is made, the communication will continue.

Figure 21:
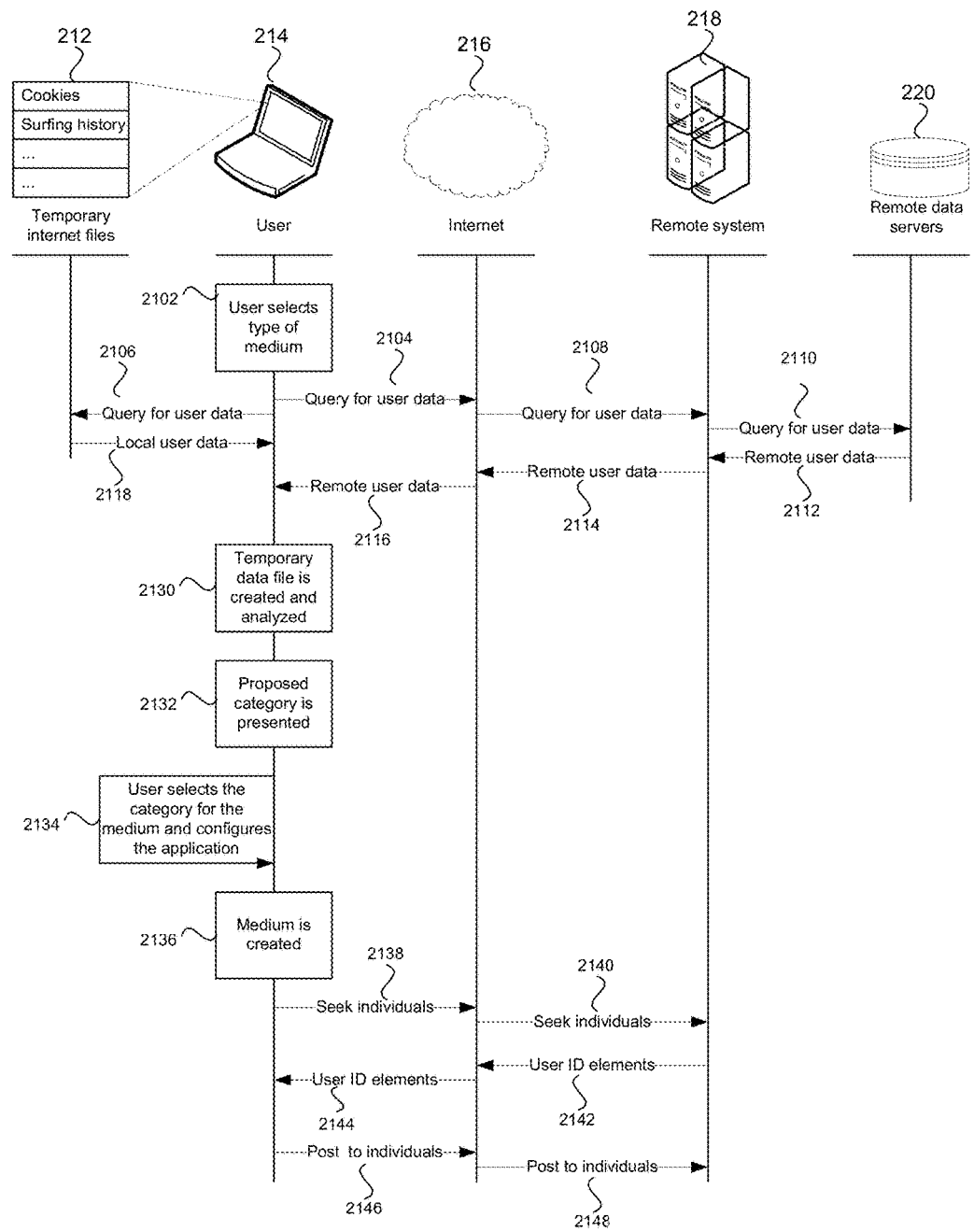
FIG. 21 shows a message flow of the medium generation application.

FIG. 21 depicts a message flow between the elements of the system. The user 214 selects the type of medium desired 2102, then the application queries the local 212 and remote 218 system in regards to the current user 2104, 2106, 2108, 2110. The local data 2118 and remote data 2116 responses are received by the application and a temporary data file is created and analyzed 2130. The text file is parsed 2130 for commonalities to determine the proper categories to present to the user 2132. The user selects the category for the medium and configures the application 2134. The medium is then created by the application 2136. Individuals relating to the chosen category and associated with the user are sought by querying the remote system 2138 and the individuals are returned to the application 2144. The application, according to the user's specific configuration will send messages to the remote individuals 2146.

A specific example for creating a blog will now be described. When the user starts the application, they are presented with the Application Top Window (see FIG. 3). The user selects the "Blog" category 32, and selects the "Start" button 35.

The application begins to gather personal information about the user by querying the user's local file system, as well as the remote systems. The application finds the following information regarding running from the user's local system:

Emails
  A chat/IM history was saved between the user and another person with the following text: "What about doing a 5 mile run on Saturday, you in?"
  An email is encountered from "runningclubofchicago.com". It discusses upcoming running events that are in the user's local area.
  An email is encountered discussing the "Runners World" magazine, regarding subscription renewal.
Surfing History
  The "RunnersWorld.com" URL was perused by the user including many internal sites to the domain.
  The "Brooks.com" website was found and many running shoes were viewed on the domain.
  A YouTube reference was found entitled "Trail Running—Best of".
Calendar Events
  An event was scheduled in the user's local calendar with the title: "5-mile run with Tony".
  An event was scheduled in the user's local calendar with the title: "Run for the Arts 10k July 22nd 2009"
Videos
  A video was found in the user's local file system entitled "Marathon Training—The Long Run.mp4"

The application finds the following information regarding running from querying the remote systems:

Google/Groups
  The user was found to be a member of the Chicago Long-Distance Running Group.
www.running-log.com
  The online training log was encountered when viewing surfing history. A published API allowed the program access to the history of events in the application.
Hulu
  The video "Chariots of Fire" was viewed by the user online.

When creating components used in the application, the application incorporates lists to be included as the dropdown or menu components. Using the results from querying the user's local system, as well as the remote system, the application creates a text-based data file wherein the data is stored for analysis. In analyzing the text data, the application classifies the elements it encounters into various categories. These categories become the list elements 181 in the category list window 180 shown in FIG. 18. Because the word, or various forms of the word "run" were encountered, the application made "running" one of the list elements.

The user selects the "Running" list element, and selects the "Start" button 185 indicating that a blog on running is desired.

The Configuration Window 190 is then presented to the user to allow the user to configure the behavior once the medium is created. The user selects to have the application automatically add one new blog per day from the email and surfing history areas. The user also selects to have outgoing notifications sent to acquaintances by checking the element 193. Finally, the user sets the timeout for notifications 194 to one day. The user then selects the "Create" button 195, and the application begins to generate the new running blog. There are various blogging sites available today allowing blogs of any nature to be created. One such site is www.blogger.com. Blogger is a Google based blogging creation site that allows a user to share thoughts with the world, as well as include photos, text, and videos. There is a registration form that needs to be filled out in order to begin a blog, as is for most, if not all, blogging sites.

The application will interact with the Blogger website via an API that is provided to developers. The API establishes a way for programmers to give external applications the ability to log into the www.blogger.com website, as well as setting the ability to accept comments to your blog, create a blog, post to a blog, etc.

The application creates the blog, and the new running blog is begun. The first blog entry is automatically entered from the data found in the Calendar events of the user's local system: "Run for the Arts 10k July 22nd 2009".

Using the published Twitter API, the application queries the user's followers and searches through the Twitter messages to find that there are three Twitter users that have been contacted in the past by the user regarding running. The three users are automatically sent the blog entries via Twitter. Their responses are posted to the blog. The Twitter entries are not inline with the main blog, but in a separate "Message" section of the blog.

Figure 22:
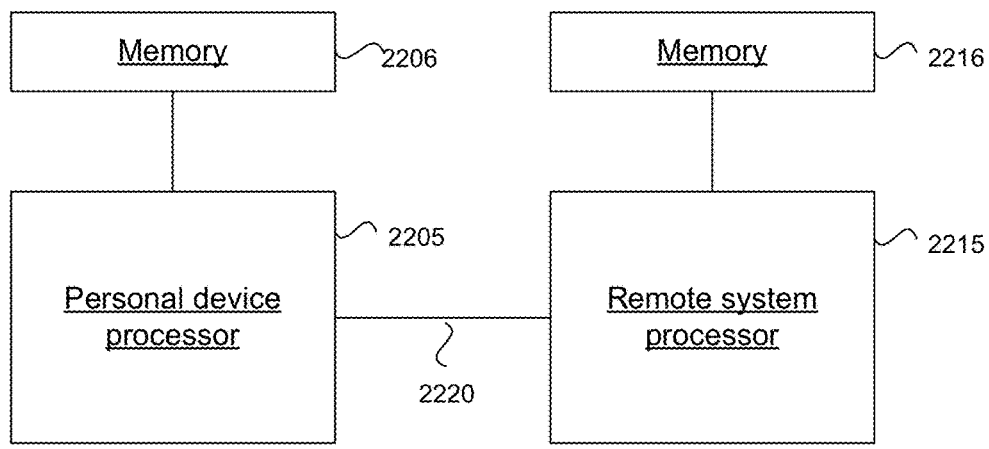
FIG. 22 shows a processor and memory of a computing device executing the medium generation application.

As will be apparent from the foregoing, the components of the system 100 may be embodied in hardware, software, firmware or a combination of hardware, software and/or firmware. In a hardware embodiment, the application may be executed on a processor of a personal computing device 103 of the user (FIG. 1). As shown in FIG. 22, a processor 2205 may be operatively associated with a memory 2206. The processor 2205 may communicate with other processes, such as a processor 2215 of a remote system 218 (FIG. 21) through communications link 2220, such as an internet link, FTP link, cellular link, and the like. The remote system processor 2215 may also be operatively associated with a memory 2216 and may also be operatively associated with the remote data servers 220 shown in FIG. 21.

Figure 23:
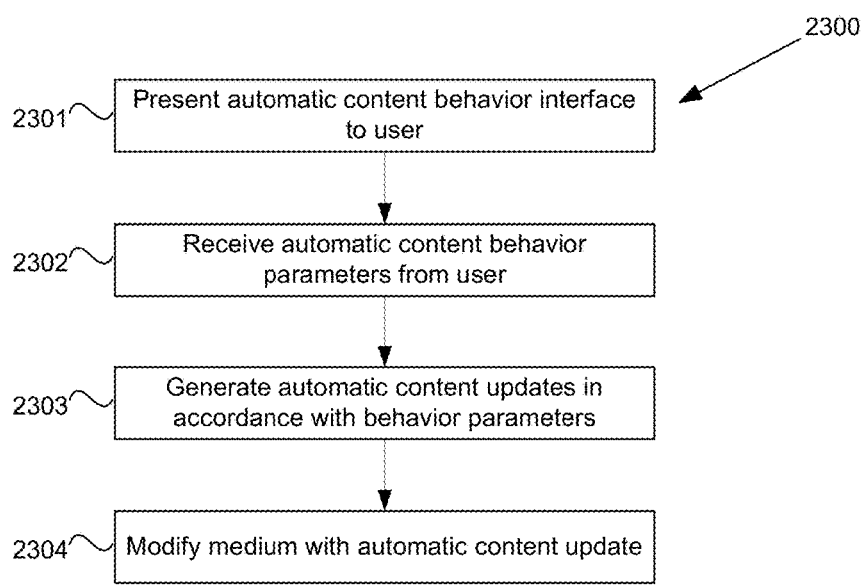
FIG. 23 shows an instruction set executable on the processor of FIG. 22.

The memory 2206 may store instructions that are executable on the processor 2205, such as for executing various aspects of the application as described above. An example instruction set 2300 that may be executed on the processor 2205 is depicted in the flowchart of FIG. 23. Specifically, when executed, the instruction set 2300 allows the processor 2205 to present an automatic content behavior interface to a user (step 2301), such as the configuration window 190 shown in FIG. 19. The processor may receive one or more parameters for automatic content behavior from the user (step 2302). At the appropriate time, such as set by an automatic update schedule configured by the user through the configuration interface 190, the processor generates an automatic content update for the medium in accordance with the at least one automatic content behavior (step 2303). The update may be generated from content received from the remote system processor 2215 as well as local systems (not shown in FIG. 22). The processor 2205 then posts the automatic content update to the medium as set by the configured automatic content behavior parameters (step 2304).

Although embodiments of the present invention have been illustrated in the accompanied drawings and described in the foregoing description, it will be understood that the invention is not limited to the embodiments disclosed, but is capable of numerous rearrangements, modifications, and substitutions without departing from the spirit of the invention as set forth and defined by the following claims. For example, the capabilities of the invention can be performed fully and/or partially by one or more of the blocks, modules, processors or memories. Also, these capabilities may be performed in the current manner or in a distributed manner and on, or via, any device able to provide and/or receive information. Further, although depicted in a particular manner, various modules or blocks may be repositioned without departing from the scope of the current invention. Still further, although depicted in a particular manner, a greater or lesser number of modules and connections can be utilized with the present invention in order to accomplish the present invention, to provide additional known features to the present invention, and/or to make the present invention more efficient. Also, the information sent between various modules can be sent between the modules via at least one of a data network, the Internet, an Internet Protocol network, a wireless source, and a wired source and via plurality of protocols.

What is claimed is:

1. A method for generating a medium on a network, comprising:
    processing a user's level of activity and selecting a medium with a highest level of activity in order to create the selected medium on the network, wherein the medium comprises a web page, a blog, a message, an instant message, or a social networking application;
    querying at least one of local and remote systems to determine user data comprising one or more current interests of the user based on personal information, wherein the personal information comprises ads that have been served, ads the user has clicked, searches requested, and surfing habits;
    processing the user data to automatically create content for the medium;
    creating the medium on the network;
    populating the medium with the automatically generated content;
    notifying one or more acquaintances of a user of the medium; and
    preventing a further notification to an acquaintance when a response from the acquaintance is not received within a timeout period, wherein
    the timeout period is automatically extended for the acquaintance when the acquaintance has previously responded.

2. The method according to claim 1, further comprising:
    ranking the current interests of the user; and
    selecting a category associated with a highest ranked current interest.

3. The method according to claim 1, wherein selecting a category dependent on the one or more current interests comprises presenting a list of current interests to the user and receiving a selected category from the user.

4. The method according to claim 1, further comprising:
    determining at least one automatic content behavior for periodically updating the medium;
    generating updated content in accordance with the automatic content behavior; and
    updating the medium with the generated updated content.

5. The method according to claim 1, further comprising:
    determining one or more acquaintances of the user.

6. The method of claim 1, wherein the personal information further comprises user location information obtained approximately using a current IP address and then more specifically by scanning cache and temporary Internet files.

7. The method of claim 1, wherein the personal information further comprises user data from one or more online games to which the user has subscriptions.

8. The method of claim 1, wherein the personal information further comprises data from DVR programs, live video streaming, web-based shows, or GPS.

9. An apparatus, comprising:
    a computer processor coupled to a non-transitory computer readable medium and memory comprising an application, wherein the application is configured to cause the computer processor to:
    present an interface to a user;
    process the user's level of activity and select a medium with a highest level of activity in order to create the selected medium on the network, wherein the medium comprises a web page, a blog, a message, an instant message, or a social networking application;
    query at least one of local and remote systems to determine user data comprising one or more current interests of the user based on personal information, wherein the personal information comprises ads that have been served, ads the user has clicked, searches requested, and surfing habits;
    process the user data to automatically create content for the medium;
    populate the medium;
    notify one or more acquaintances of a user of the medium; and
    prevent a further notification to an acquaintance when a response from the acquaintance is not received within a timeout period, wherein
    the timeout period is automatically extended for the acquaintance when the acquaintance has previously responded.

10. The apparatus according to claim 9, wherein the application is further configured to cause the processor to process user data in one or more local directories of the personal computing device to automatically generate content to populate the medium.

11. The apparatus according to claim 9, wherein the user data is stored on one or more remote computer devices.

12. The apparatus according to claim 9, wherein the application is further configured to cause the processor to:
    determine a topic of the medium;
    determine acquaintances of the user;
    determine one or more of the acquaintances that have an interest in the topic; and
    notify the one or more acquaintances that are interested in the topic about the medium.

13. The apparatus according to claim 12, wherein the application is further configured to cause the processor to:
    automatically generate at least one content update to the medium;
    update the medium with the at least one automatically generated content update; and
    notify at least one of the one or more acquaintances that are interested in the topic about the at least one automatically generated content update.

14. A non-transitory computer-readable medium comprising computer-executable instructions for execution by at least one processor, that, when executed, are configured to cause the at least one processor to:
    process a user's level of activity and select a medium with a highest level of activity in order to create the selected medium on the network, wherein the medium comprises a web page, a blog, a message, an instant message, or a social networking application;
    query at least one of local and remote systems to determine one or more current interests of the user based on personal information, wherein the personal information comprises ads that have been served, ads the user has clicked, searches requested, and surfing habits;

process at the user data to automatically create content for the medium;

present an automatic content behavior interface to a user;

receive one or more parameters of at least one automatic content behavior from the user;

create at least one automatic content update for a medium in accordance with the at least one automatic content behavior;

modify a medium with the at least one automatic content update in accordance with the automatic content behavior;

notify one or more acquaintances of a user of the medium; and set a timeout period for notifications to an acquaintance of the user based on historical response times by the user and the acquaintance, historical response times by the user and a similar acquaintance, an average response time based on all users, an average response time based on all users utilizing a particular category, or any combination thereof, wherein the timeout period is automatically extended for the acquaintance when the acquaintance has previously responded.

15. The non-transitory computer-readable medium according to claim 14, wherein the medium comprises a topic and wherein the computer-readable medium comprises instructions that, when executed, cause the at least one processor to:

query at least one of local user data or remote user data; and process at least one response to the query to generate an automatic content update in relation to the topic.

16. The non-transitory computer-readable medium according to claim 15 comprising instructions that, when executed, cause the at least one processor to notify one or more acquaintances of the user about a modification of the medium.

17. The non-transitory computer-readable medium according to claim 16 comprising instructions that, when executed, cause the processor to modify one or more parameters of the at least one automatic content behavior based on responses from at least one of the one or more acquaintances.

18. The non-transitory computer-readable medium according to claim 15 wherein the automatic content behavior comprises one or more acquaintance notification behavior and the computer-readable medium comprises instructions that, when executed, cause the processor to:

determine one or more acquaintances of the user;

determine one or more of the acquaintances that have an interest in the topic;

notify the one or more acquaintances that are interested in the topic about the automatic content update of the medium.

* * * * *